J. B. STRICKLER.
Bee Hive.
No. 37,310.
Patented Jan. 6, 1863.
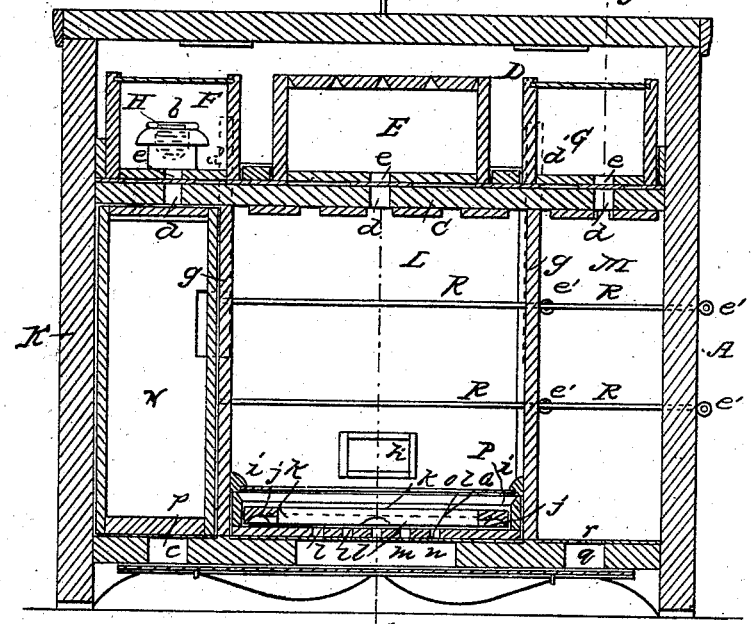
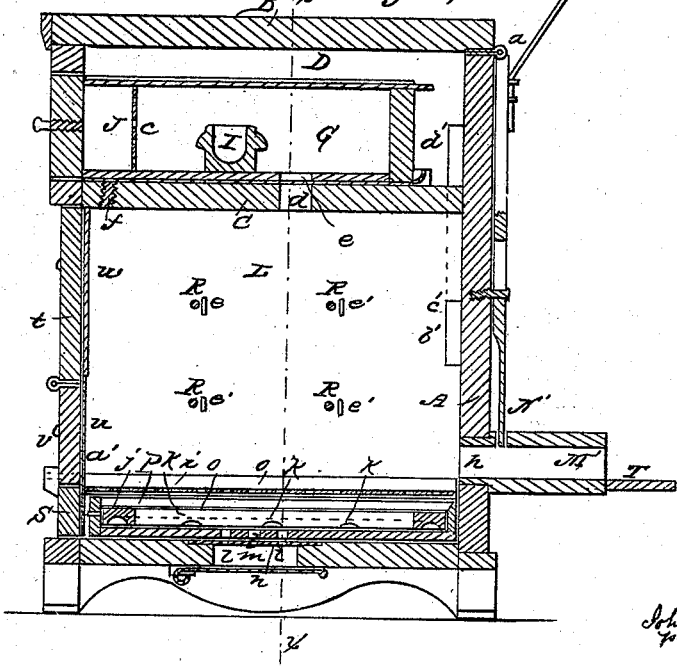

UNITED STATES PATENT OFFICE.

JOHN B. STRICKLER, OF MILFORD, ILLINOIS.

IMPROVEMENT IN BEE-HIVES.

Specification forming part of Letters Patent No. 37,310, dated January 6, 1863.

*To all whom it may concern:*

Be it known that I, JOHN B. STRICKLER, of Milford, in the county of Iroquois and State of Illinois, have invented a new and Improved Bee-House; and I do hereby declare that the following is a full, clear, and exact description of the same, reference being had to the accompanying drawings, making a part of this specification, in which—

Figure 1 is a vertical portion of my invention, taken in the line $x\,x$, Fig. 2; Fig. 2, a vertical section of the same, taken in the line $y\,y$, Fig. 1.

Similar letters of reference indicate corresponding parts in the two figures.

The object of this invention is to obtain a bee-hive, or rather bee-house, of larger dimensions than an ordinary hive, by which large quantities of honey may be made in a single season, and at the same time afford good facilities for ventilation and the capturing and destroying of the moth, as well as facilities for abstracting the spare honey from the hive and the taking of the young queens therefrom in order to multiply colonies without swarming.

To enable those skilled in the art to fully understand and construct my invention, I will proceed to describe it.

A represents the body or external case of the bee-house, which is of rectangular form and much larger dimensions than ordinary bee-hives—say three and a half or four feet long, one foot eight inches wide, and from three and a half to four feet high. This may be considered a moderate size; but when the invention is designed to be placed in a garret or an apartment in a building prepared for it, it would be better to have it about five feet high and six feet long, but not greater in width than one foot eight inches. If wider than this, combs might be detached and fall by their own gravity. The case A is provided with a lid or cover, B, which is attached to it at the back part by hinges $a$, and in the upper part of the case there is placed permanently a horizontal partition, C, which forms a compartment, D, in the upper part of the case. In this compartment there are placed three drawers, E F G, the central one, E, being a spare-honey drawer. The drawer F is designed for a feed and water receptacle, and it is provided with a water-cup, H, in which a piece of cork, $b$, or other light substance is placed to float on the water to support the bees while drinking. The other remaining drawer, G, is designed for entrapping the young queen-bee, and it is provided with a vessel, I, in which honey and the oil of anise are placed to attact the queens. When the queens are within the drawer, the young one is placed in a compartment, J, formed in the drawer G by a perforated partition, $c$, and the old queen is expelled or driven back, the food removed, and the bees belonging to the young queen will enter the drawer G. The latter, with its colony, may then be removed from the case and the colony placed in its new house or hive designed for it. All of the drawers E F G are made to communicate with the apartments below the partition C by means of openings $d$, which are covered by laterally-moving slides or plates $e$, pivoted at one end, as shown at $f$ in Fig. 2. The drawers are all removed from the back of the hive. The part of the case A below the partition C is divided by vertical partitions $g\,g$ into three compartments, K L M, all of which are shown in Fig. 1. The compartment K has a box, N, inserted in it, which occupies its whole space. This box N may be termed a "spare-honey box," as it is designed to remove it when it is full of honey and replace it by an empty one. The box N and compartment M do not communicate directly with the bee-entrance $h$. The latter communicates with the central compartment, L, and is connected with a horizontal trunk, M', in which a vertical slide, N', is fitted, as shown in Fig. 2. In the lower part of the central compartment, L, there is placed a horizontal slotted slide, O. This slide may be constructed of sheet metal and fitted in grooves made in cleats $i\,i$, attached to the partitions $g\,g$, as shown clearly in Fig. 1. Below this slide O there is a drawer, P, in which a rectangular frame, Q, is placed. This frame is fitted snugly within the drawer, it being in contact with its sides all around, and said frame is made concave or hollowed out at its under surface to form a chamber, $j$, which communicates with the drawer P by openings $k$, made in the inner sides or edges of the frame. The drawer P communicates with the external air by means of perforations $l$ in its bottom, which are directly over an opening, $m$, in the bottom of the case A. The opening $m$ is covered by a perforated sheet-metal plate, $n$. (See both figures.) The compartment K, in which the box N is placed, also has an opening, o, at its bottom, covered by a perforated sheet-metal plate, p, for the purpose of ventilating said compartment when the box N is not used. The compartment M is furnished with the same ventilating means, q being the opening, and r the perforated plate. (See Fig. 1.) All the openings m o q may be covered or closed, when desired, by a plate, s, attached to the bottom of the case A. The back of the case A is provided with a plate or door, t, which is attached to a strip, u, secured by screws v to the sides of the case, and the back of each compartment, as well as the back of the box N, are provided each with a glass, w, at their upper parts, and with perforated sheet-metal plates a' at their lower parts. Each partition g g has a hole, b', made in it adjoining the front of the case, and these holes form a communication between the central compartment, L, and the box N, and compartment M. The holes b' are each provided with a slide, c', which are operated by bars d', passing all through the partition C.

In the compartments L M there are placed sliding rods R. These rods are of metal. Steel would probably be the preferable material. The rods of the compartment L extend through the partition g between the compartments L M, and the rods of the partition M extend through the side of the case A. All of them are bent in loop form, as shown at e', so that they may be easily grasped by the hand and withdrawn to admit of the combs being removed when desired. At the bottom of the back of the case there is a removable strip, f, which covers the drawer P.

The frame Q in the drawer P serves as a moth-trap. The moth will fall through the perforated or slotted slide O into the drawer P, and pass into the chamber j. The drawer, it will be seen, can readily be removed at any time for the purpose of destroying the moth. The bees may be readily removed from one compartment in the case to the other by smoking them out, a lighted paper being applied to the proper opening in the bottom of the case. This is necessary in order that the honey may be removed without danger of the of the operator being stung.

To the trunk M' there is attached an alighting-board, T. (Shown in Fig. 2.) This trunk will vary in length, according to the thickness of the wall it is to pass through, as the principal design is to set the bee-hive in a room against the wall and have the trunk extend from the interior of the bee-house through the wall to the outside of the building for the bees to pass in and out.

Having thus described my invention, what I claim as new, and desire to secure by Letters Patent, is—

1. The arrangement and combination of the drawers E F G with the compartments K L M, drawer P, slotted or perforated slide O, and frame Q, all arranged within the case A, to form a new and improved bee-house, as herein set forth.

2. The bait-receptacle I in the drawer G, in combination with the compartment J, for the purpose of entrapping the queen and removing the surplus colony from the bee-house, as herein set forth.

3. The sliding comb-supporting rods R, arranged as shown, for the purpose specified.

JOHN B. STRICKLER.

Witnesses:
M. PIERCE,
JESSE CURL.